United States Patent
Ohmuro (10) Patent No.: US 9,641,816 B2
(45) Date of Patent: May 2, 2017

(54) IMAGE PICKUP APPARATUS CAPABLE OF SELECTIVELY PICKING UP A COLOR IMAGE AND A BLACK-AND-WHITE IMAGE

(71) Applicant: CANON KABUSHIKI KAISHA, Tokyo (JP)

(72) Inventor: Ryuji Ohmuro, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/002,766

(22) Filed: Jan. 21, 2016

(65) Prior Publication Data
US 2016/0219255 A1    Jul. 28, 2016

(30) Foreign Application Priority Data
Jan. 27, 2015   (JP) .................................. 2015-012914

(51) Int. Cl.
H04N 9/097  (2006.01)
H04N 9/04   (2006.01)
G02B 27/00  (2006.01)

(52) U.S. Cl.
CPC ......... H04N 9/097 (2013.01); G02B 27/0006 (2013.01); H04N 9/045 (2013.01)

(58) Field of Classification Search
CPC ..... H04N 9/097; H04N 9/045; G02B 27/0006
See application file for complete search history.

(56) References Cited

U.S. PATENT DOCUMENTS

| 7,619,803 B2 | 11/2009 | Kokeguchi et al. |
| 9,030,590 B2* | 5/2015 | Kim ....................... G03B 19/12 348/335 |
| 9,131,199 B2 | 9/2015 | Takahashi et al. |
| 2003/0160886 A1* | 8/2003 | Misawa ............... H04N 5/2253 348/347 |
| 2004/0252099 A1 | 12/2004 | Walder et al. |
| 2007/0188650 A1* | 8/2007 | Kobayashi ........... G03B 19/023 348/344 |

FOREIGN PATENT DOCUMENTS

| JP | 2003309858 A | 10/2003 |
| JP | 2004537743 A | 12/2004 |
| JP | 2013223152 A | 10/2013 |
| WO | 2006129424 A1 | 12/2006 |

* cited by examiner

*Primary Examiner* — Tuan Ho
(74) *Attorney, Agent, or Firm* — Rossi, Kimms & McDowell LLP

(57) ABSTRACT

Provided is an image pickup apparatus comprising: a light control mirror element (ace CME) having a function of splitting an incident light flux (LF) into a first LF from reflection and a second LF from transmission and a function of switching between a semi-transmissive/semi-reflective state (s-t/s-rS) and a totally reflective state (TRS); a LF splitting unit causes first and second LFs to be emitted from first and second exit surfaces (ES), respectively; an electrochromic element (EE) switches between a state of transmitting light having a first wavelength range (WR) out of first LF (first state) and a state of transmitting light having a second WR out of first LF (second state); and a control device conducts switching control between a first mode in which LCME is in s-t/s-rS and EE is in first state and a second mode in which LCME is in TRS and EE is in second state.

7 Claims, 4 Drawing Sheets

LIGHT CONTROL MIRROR ELEMENT
(ON STATE)

FIG. 2B

FIG. 3A
LIGHT CONTROL MIRROR ELEMENT (OFF STATE)

FIG. 3B

FIG. 4A
EC ELEMENT (ON STATE)

FIG. 4B
EC ELEMENT (OFF STATE)

NEAR INFRARED CUT FILTER

IMAGE PICKUP APPARATUS CAPABLE OF SELECTIVELY PICKING UP A COLOR IMAGE AND A BLACK-AND-WHITE IMAGE

BACKGROUND OF THE INVENTION

Field of the Invention

The present invention relates to an image pickup apparatus capable of selectively picking up a color image and a black-and-white image (monochrome image). In particular, the present invention is preferred for an image pickup apparatus, such as a surveillance camera, which is demanded to exhibit a high resolution at a time of picking up a color image and exhibit a high sensitivity at a time of picking up a black-and-white image.

Description of the Related Art

In recent years, a surveillance camera has been demanded to increase accuracy of an image to be obtained. For example, pickup of a color image of a target object allows not only shape recognition of the object but also acquisition of more information on the target object, such as a kind thereof or a feature thereof, from abundant color information, which facilitates identification of the target object. Hitherto, many image pickup apparatus often employ a single-plate type to obtain a color image by using one image pickup element. An image pickup apparatus of the single-plate type is configured to obtain the color image by providing a color mosaic filter in front of the image pickup element (between the image pickup element and a lens for forming an object image) (Japanese Patent Application Laid-Open No. 2013-223152).

Figure 9:
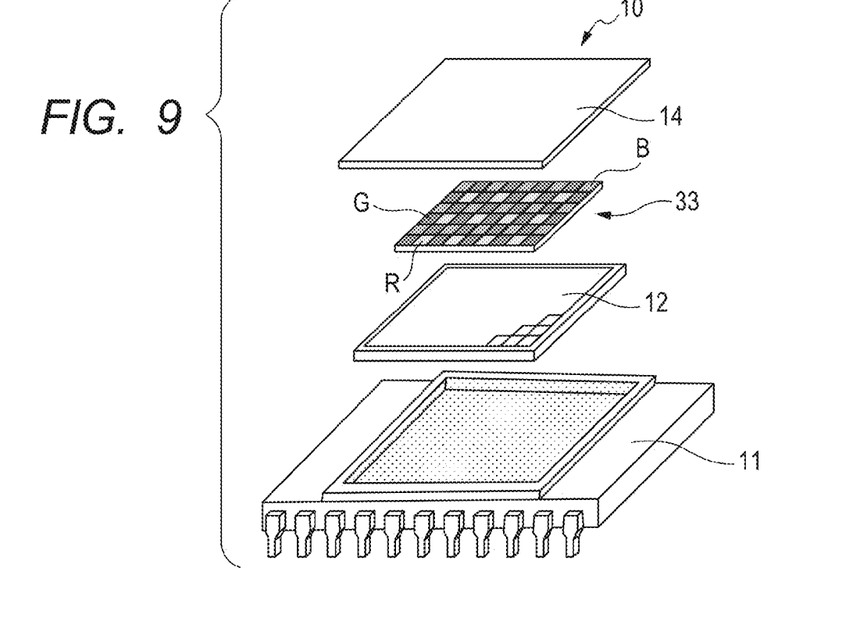
FIG. 9 is an explanatory diagram of a related-art image pickup unit.

FIG. 9 is an exploded perspective view of an image pickup unit 10 including a solid-state image pickup element used for a related-art color camera of the single-plate type. The image pickup unit 10 includes a package 11, a solid-state image pickup element 12, a mosaic filter 33 for color separation, and front glass (cover glass) 14. The mosaic filter 33 is configured such that a green (G) filter is located for two pixels among every four pixels, a red (R) filter is located for one pixel of the remaining pixels, and a blue (B) filter is located for the last remaining pixel.

In the resolution of the color camera of the single-plate type, a contribution ratio of the pixel for green (G) is large and contribution ratios of the pixels for red (R) and blue (B) are low. Thus, the color camera of the single-plate type obtains the color image at the cost of the resolution of the image pickup element intrinsic to the image pickup unit 10.

In addition, there is known a color camera of a three-plate type obtained by combining a color separation optical system of a prism type and three image pickup elements in order to obtain the color image (Japanese Patent Application Laid-Open No. 2003-309858). Recently, the color camera of the three-plate type using a solid-state image pickup element easy to handle is often used, and the color camera of this type causes less degradation in the resolution than the color camera of the single-plate type using the one image pickup element. Further, the color camera of the three-plate type has a feature of exhibiting high energy utilization efficiency of light because the light is split into a plurality of wavelength regions to be received by the respective image pickup elements.

The image pickup apparatus including one image pickup element provided with the color mosaic filter in order to obtain the color image has a simplified overall configuration, but has a lower resolving power than the resolution exhibited by the single image pickup element. When a photographing area (photographing field angle) is set wider, the surveillance camera is enabled to monitor a wider range with a smaller dead angle, which increases safety. However, the lowered resolution lowers a shape recognition rate even when the color information on the target object can be recognized. Therefore, the photographing area is hard to widen in order to obtain the photographing area suitable for the resolution.

In order to monitor a suspicious ship or the like at a longer distance, the surveillance camera used for harbor surveillance or the like is required to use a photographing lens having a longer focus distance. However, when the resolving power is lowered, it becomes difficult to recognize an object at a distance with high accuracy.

The color camera of the single-plate type is not originally high in light utilization efficiency. One of the factors therefor is that the mosaic color filter conducts spatial color separation as described above. Another of the factors is that light energy utilization efficiency is lowered when the mosaic color filter itself absorbs not only unnecessary light but also light having a necessary wavelength band.

The surveillance camera is desired to be capable of photographing with small noise and a high resolution during photographing under a low illuminance, for example, during nighttime. However, the light utilization efficiency is not high as described above, and hence incident light energy with respect to the image pickup element is small under a low illuminance, which leads to a tendency that noise becomes larger with the lowered resolving power.

In the color camera of the three-plate type, the spatial color separation is not conducted, and hence the resolving power of the image pickup element is maintained, which facilitates prevention of degradation in the resolution. However, the color camera of the three-plate type tends to become lower in the resolving power. The color camera of the three-plate type uses light energy more efficiently as the color camera than the color camera of the single-plate type. However, the light is split based on the wavelength to enter the image pickup element, and hence energy of light entering one image pickup element is not 100%. For example, the light entering the color separation optical system has an energy distribution only within a visible range.

In the color separation optical system used for the color camera of the three-plate type, the light is split into three wavelength bands of a green wavelength band, a red wavelength band, and a blue wavelength band. That is, the energy of the incident light is guided to the image pickup element by being divided into approximately ⅓ for each color of the light. However, under a low illuminance that does not exhibit a sufficient light amount, the energy of the light entering the individual image pickup element is small with large noise, which lowers the resolving power of the image pickup element. In particular, there is a problem in that a signal-to-noise ratio does not improve even when signals from the three image pickup elements are added up.

The surveillance camera of the single-plate type or the like may obtain a higher resolving power by obtaining a black-and-white image than by picking up a color image when the object whose image is to be picked up has a low illuminance.

On the other hand, when the object whose image is to be picked up has a high illuminance, the pickup of the color image through use of a plurality of image pickup elements allows the color information on the object to be obtained as well while alleviating lowering of the resolving power, and allows improvement of the recognition rate. However, it requires a complicated configuration, and is considerably difficult, to selectively pick up the color image and the black-and-white image between when the object whose image is to be picked up by one surveillance camera has a low illuminance and when the object has a high illuminance.

SUMMARY OF THE INVENTION

The present invention has an object to provide an image pickup apparatus capable of selectively picking up a color image and a black-and-white image while satisfactorily maintaining a resolving power by appropriately using an image pickup element and an electrochromic element capable of easily controlling spectral characteristics of a reflected light and a transmitted light.

According to one embodiment of the present invention, there is provided an image pickup apparatus, including: a light control mirror element having a function of splitting an incident light flux into a first light flux derived from reflection and a second light flux derived from transmission and a function of switching between a semi-transmissive/semi-reflective state and a totally reflective state; a light flux splitting unit configured to cause the first light flux to be emitted from a first exit surface, and cause the second light flux to be emitted from a second exit surface; an electrochromic element configured to switch between a state of transmitting light having a first wavelength range out of the first light flux and a state of transmitting light having a second wavelength range out of the first light flux; a first image pickup element configured to pick up an image of the first light flux emitted from the first exit surface; a second image pickup element configured to pick up an image of the second light flux emitted from the second exit surface; and a control device configured to conduct switching control between a first mode in which the light control mirror element is in the semi-transmissive/semi-reflective state and the electrochromic element is in the state of transmitting the light having the first wavelength range and a second mode in which the light control mirror element is in the totally reflective state and the electrochromic element is in the state of transmitting the light having the second wavelength range.

Further features of the present invention will become apparent from the following description of exemplary embodiments with reference to the attached drawings.

DESCRIPTION OF THE EMBODIMENTS

Now, an image pickup apparatus according to the present invention is described with reference to the accompanying drawings. The image pickup apparatus according to the present invention includes a light flux splitting unit including a light control mirror element having a function capable of splitting an incident light flux into a first light flux derived from reflection and a second light flux derived from transmission and a function capable of switching between a semi-transmissive/semi-reflective state and a totally reflective state. The light flux splitting unit causes the first light flux to be emitted from a first exit surface, and causes the second light flux to be emitted from a second exit surface. The image pickup apparatus further includes an electrochromic element, which is provided on the first exit surface and is configured to switch between a state of transmitting light having a predetermined wavelength range (first wavelength range) within a visible range and a state of transmitting light having the visible range (second wavelength range).

The image pickup apparatus further includes a first image pickup element configured to pick up an image of the first light flux emitted from the first exit surface and a second image pickup element configured to pick up an image of the second light flux emitted from the second exit surface. A mode in which the light control mirror element is in the semi-transmissive/semi-reflective state and the electrochromic element is in the state of transmitting the light having the predetermined wavelength range within the visible light is set as a first mode. Further, a mode in which the light control mirror element is in the totally reflective state and the electrochromic element is in the state of transmitting the light having the visible range is set as a second mode. The image pickup apparatus further includes the control device configured to conduct switching control between the first mode and the second mode. In this case, the predetermined wavelength range within the visible range is set as a wavelength range of a green light.

In this case, in the first mode, a color image is formed through use of an image pickup signal obtained from the first image pickup element and an image pickup signal obtained from the second image pickup element. In the second mode, the image pickup signal obtained from the first image pickup element is used to form a black-and-white image (monochrome image).

First Embodiment

Figure 1:
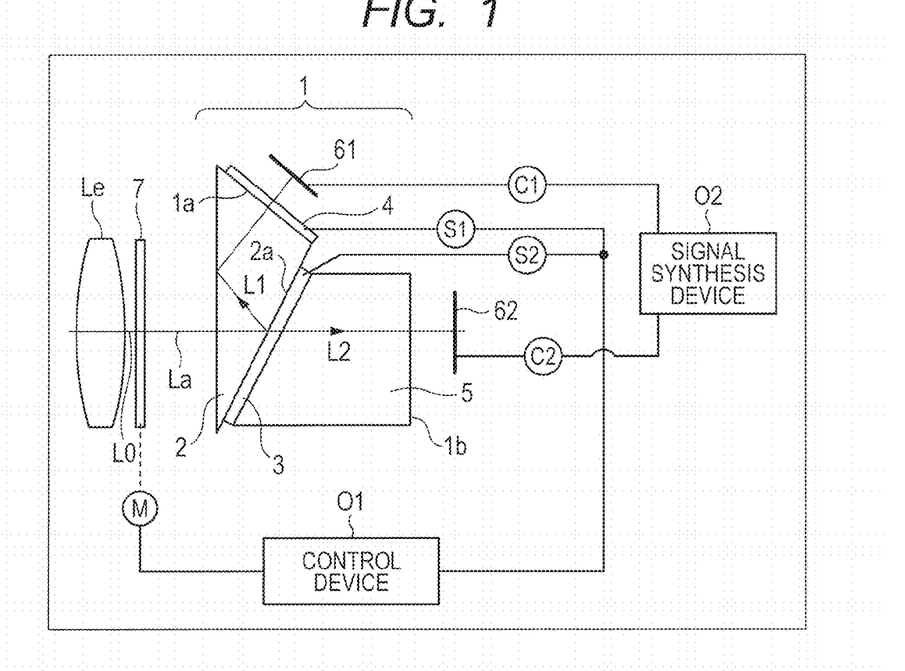
FIG. 1 is a schematic diagram of a main part of an image pickup apparatus according to a first embodiment of the present invention.

FIG. 1 is a schematic diagram of a main part of an image pickup apparatus according to a first embodiment of the present invention. In FIG. 1, an image pickup optical system Le is removably attached to the image pickup apparatus according to the present invention. A near infrared cut filter (IRCut F.) 7 blocks a near infrared light from an imaging light flux L0 that has passed through the image pickup optical system Le, and transmits a visible light La. A drive unit M causes the IRCut F. 7 to be inserted into an optical path and retracted from within the optical path based on a signal from a control device O1.

In the first embodiment, the drive unit M is constantly in an OFF state, and the IRCut F. 7 is constantly placed in the optical path. A light flux splitting unit 1 includes a first prism 2, a second prism 5, and a light control mirror element 3. The light flux (visible light) La that has passed through the IRCut F. 7 enters the light flux splitting unit 1. The light flux splitting unit 1 splits the incident light flux La into a plurality of light fluxes, and guides the plurality of light fluxes to a first image pickup element 61 and a second image pickup element 62 that are arranged in the respective optical paths. The light flux splitting unit 1 includes a first reflection surface 2a configured to split an incident light flux into a first light flux L1 derived from reflection and a second light flux L2 derived from transmission.

The first reflection surface 2a forms a known light control mirror element 3 capable of switching between the semi-transmissive/semi-reflective state (semitransparent mirror state) and the totally reflective state of reflecting substantially entire light. The light control mirror element 3 switches the state of the first reflection surface 2a between the semitransparent mirror state and the totally reflective state based on a signal from a control unit S2.

The light flux splitting unit 1 includes the first prism 2 configured to guide the first light flux L1 to the first image pickup element 61 and the second prism 5 configured to guide the second light flux L2 to the second image pickup element 62. An electrochromic element (EC element) 4 is placed between a light emitting surface 1a and the first image pickup element 61 and is capable of switching between the state of transmitting the light flux having the predetermined wavelength range, for example, green light and the state of transmitting the light having the visible range within the visible light. The EC element 4 switches the state of the light flux passing therethrough based on a signal from a control unit S1.

A processing unit C1 inputs an image signal obtained by the first image pickup element 61 to a signal synthesis device O2. The driving of the processing unit C1 is in an ON state at any one of a time of the color image pickup and a time of the black-and-white image pickup. A processing unit C2 inputs an image signal obtained by the second image pickup element 62 from the light flux that has passed through a light exit surface 1b to the signal synthesis device O2. The processing unit C2 is in an ON state at the time of the color image pickup (image pickup state), and is in an OFF state at the time of the black-and-white image pickup (image pickup suspended state).

The control unit S1 controls a passage state of the light flux passing through the EC element 4 based on the signal from the control device O1. At the time of the color image pickup, the driving of the control unit S1 is in an ON state, and the EC element 4 is in a passage state of passing only the green light within the visible light. At the time of the black-and-white image pickup, the driving of the control unit S1 is in an OFF state, and the EC element 4 is in a transmission state of transmitting the light ranging from the visible light to the near infrared light.

The control unit S2 controls a passage state of the light flux passing through the light control mirror element 3 based on the signal from the control device O1. At the time of the color image pickup, the driving of the control unit S2 is in an ON state, and the light control mirror element 3 is in the semi-transmissive/semi-reflective semitransparent mirror state. At the time of the black-and-white image pickup, the driving of the control unit S2 is in an OFF state, and the light control mirror element 3 is in the totally reflective state (containing almost no transmitted light).

In this embodiment, the drive unit M is in the OFF state at any one of the time of the color image pickup and the time of the black-and-white image pickup, and the IRCut F. 7 is placed within the optical path.

In this embodiment, the color image is picked up when an object whose image is to be picked up is bright under a sufficient illuminance, and the black-and-white image is picked up when there is no sufficient illuminance.

The ON state and the OFF state of operations of the respective members used when an image is picked up by switching between the color image and the black-and-white image in this embodiment and optical actions of the respective members are shown below in Table 1 as "First embodiment". The second image pickup element 62 includes a mosaic filter in which, for example, a red filter that transmits red and a blue filter that transmits blue are two-dimensionally arranged in a mosaic shape, and has a function capable of converting a red image and a blue image into electric signals. The light control mirror element 3 is joined between two prism members.

Figure 2A:
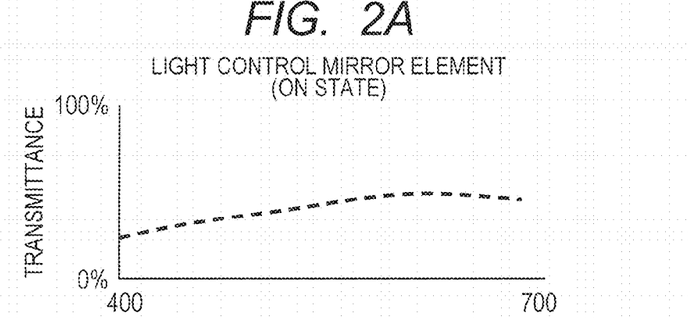
FIG. 2A is a characteristic graph of a light control mirror element of FIG. 1 in a semi-transmissive/semi-reflective state.
Figure 2B:
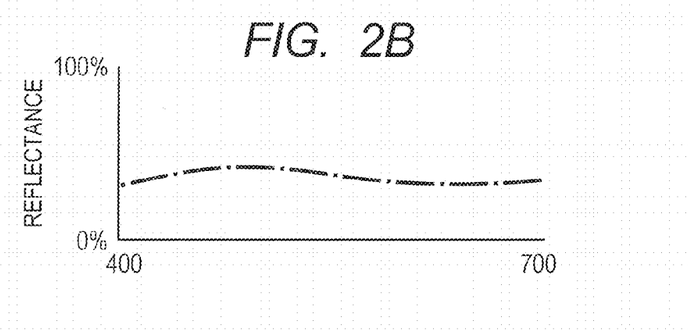
FIG. 2B is a characteristic graph of the light control mirror element of FIG. 1 in the semi-transmissive/semi-reflective state.
Figure 3A:
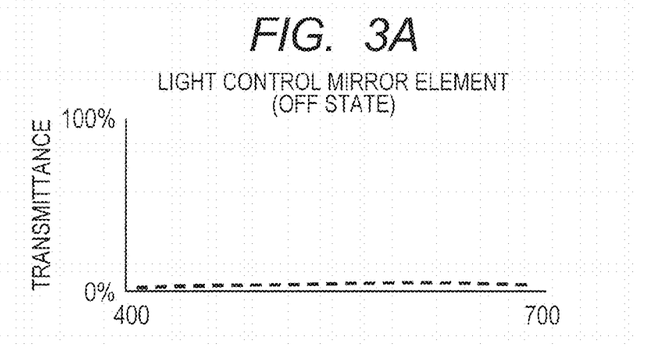
FIG. 3A is a characteristic graph of the light control mirror element of FIG. 1 in a mirror state.
Figure 3B:
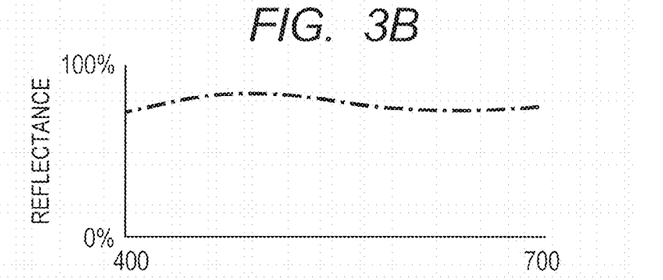
FIG. 3B is a characteristic graph of the light control mirror element of FIG. 1 in the mirror state.

The light control mirror element 3 is a known element capable of switching a transparent state and a mirror state depending on an application state of a voltage based on a principle of electrochromism (International Publication No. WO2006/129424 and Japanese Patent Application Laid-Open No. 2004-537743). The light control mirror element 3 may enable a semi-transmissive/semi-reflective state (semi-transparent mirror state) (ON state) as shown in FIG. 2A and FIG. 2B by, for example, applying a voltage. By applying a voltage inverted from this state, the light control mirror element 3 may enable the mirror state (totally reflective state) (OFF state) as shown in FIG. 3A and FIG. 3B. This change is a reversible change.

The EC element 4 also operates based on the principle of electrochromism. The EC element 4 is different from the light control mirror element 3 in terms of transmission and reflection of light. The EC element 4 has a state (hereinafter referred to as "color emission state") (ON state) of emitting a color by absorbing the blue light and the red light and transmitting the green light. In addition, the EC element 4 has a state (hereinafter referred to as "non-color emission state") (OFF state) of transmitting the light having the visible range and almost the entire near infrared range adjacent thereto without having an exceptional absorption range. The EC element 4 is a known element that makes a transition between both the color emission state and the non-color emission state.

Figure 4A:
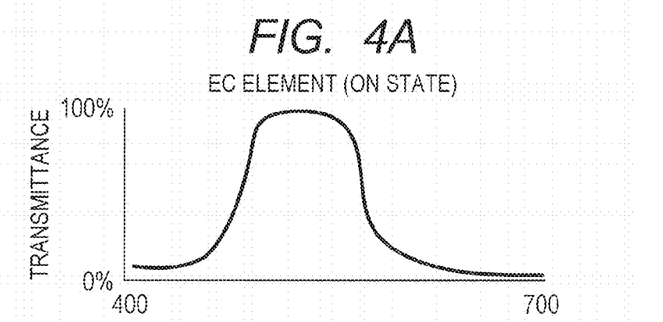
FIG. 4A is a graph for showing an example of spectral characteristics of an electrochromic element of FIG. 1.
Figure 4B:
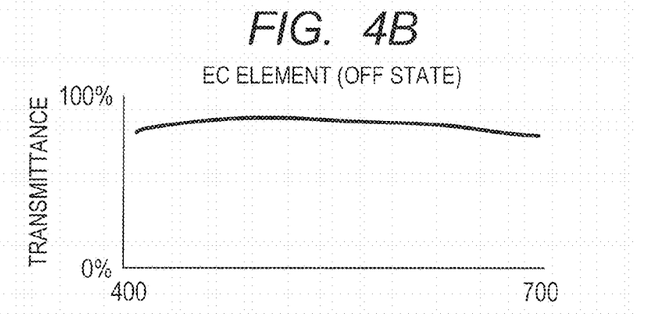
FIG. 4B is a graph for showing an example of spectral characteristics of the electrochromic element of FIG. 1.

Characteristics of the EC element 4 in the color emission state (ON state) are shown in FIG. 4A, and characteristics thereof in the non-color emission state (OFF state) are shown in FIG. 4B. Depending on a manner of applying electric energy to the EC element 4, there also exists an intermediate state of color emission between the color emission state shown in FIG. 4A and the non-color emission state shown in FIG. 4B, but this embodiment employs roughly classified two states of the color emission state and the non-color emission state.

Next, an operation of this embodiment is described. First, in the image pickup state (first mode) in which a sufficient illumination is obtained, a color image is picked up. A state exhibited when the color image is formed at this time is described below with reference to Table 1.

First, the control unit S2 is turned ON to bring the light control mirror element 3 to the semi-transmissive/semi-reflective state (semitransparent mirror state) exhibiting the characteristics as shown in FIG. 2A and FIG. 2B. Further, the control unit S1 is also turned ON to bring the EC element 4 to the color emission state of transmitting the green light as shown in FIG. 4A. An imaging light flux from the image pickup optical system Le passes through the near infrared cut filter 7 to become the visible light La, and enters the light flux splitting unit 1. The incident imaging light flux La reaches the light control mirror element 3 provided on a surface of the first prism 2. The first reflection surface 2a of the light control mirror element 3 is in the semi-transmissive/semi-reflective state, and hence the imaging light flux La is split into two light fluxes of the transmitted light L2 and the reflected light L1.

The reflected imaging light flux L1 is caused by the first prism 2 to reach the EC element 4 provided on the light emitting surface 1a of the first prism 2. A green imaging light flux that has passed through the EC element 4 in the color emission state reaches the first image pickup element 61, and has a green image converted into an electric signal by the first image pickup element 61. The processing unit C1 inputs the green image to the signal synthesis device O2.

On the other hand, the imaging light flux L2 that has transmitted through the light control mirror element 3 is emitted from the light exit surface 1b of the second prism 5 to reach the second image pickup element 62, and is converted into the electric signals of the red image and the blue image by the second image pickup element 62. The processing unit C2 is in the ON state, and inputs an R-image of a red signal and a B-image of a blue signal to the signal synthesis device O2. The signal synthesis device O2 forms, as a color camera, the color image based on a green electric signal generated by the first image pickup element 61 and a red electric signal and a blue electric signal generated by the second image pickup element 62.

Next, in a photographing state (second mode) exhibiting a low illuminance, a black-and-white image is picked up. A state exhibited when the black-and-white image is formed at this time is described. The control unit S2 is turned OFF to switch the light control mirror element 3 to the mirror state (totally reflective state) exhibiting the characteristics as shown in FIG. 3A and FIG. 3B. The control unit S1 is also turned OFF to switch the EC element 4 to the non-color emission state (state of transmitting the visible light) as shown in FIG. 4B. The imaging light flux from the image pickup optical system Le passes through the near infrared cut filter 7 to become the visible light La, and enters the light flux splitting unit 1.

The incident imaging light flux La reaches the light control mirror element 3 provided on the surface of the first prism 2. The light control mirror element 3 is in the mirror state, and hence most of energy of the light flux is reflected thereby with partial light energy being lost due to a slight amount of the transmitted light and absorption. The second image pickup element 62 stops functioning because the light is hardly being received.

On the other hand, the reflected imaging light flux L1 is caused by the first prism 2 to reach the EC element 4 provided on the light emitting surface 1a of the first prism 2. The EC element 4 is in the non-color emission state, and hence the light energy of the imaging light flux passes through the EC element 4 substantially as it is to reach the first image pickup element 61, and has a white image converted into a black-and-white electric signal by the first image pickup element 61. The processing unit C1 inputs the black-and-white image obtained by the first image pickup element 61 to the signal synthesis device O2. The processing unit C2 is turned OFF to bring the image pickup to a suspended state, and no image is obtained by the second image pickup element 62. With this operation, as a single-plate black-and-white camera, the image pickup apparatus forms the black-and-white image.

The ON state and the OFF state involved in the driving of the drive unit M, the control unit S1, the control unit S2, the processing unit C1, the processing unit C2, and the like when the color image and the black-and-white image are picked up in the first embodiment and optical actions exhibited at that time are shown in Table 1.

TABLE 1

| | | Table of states | | | | |
|---|---|---|---|---|---|---|
| | | Control unit S1 | Control unit S2 | Processing unit C1 | Processing unit C2 | Drive unit M |
| First embodiment | Time of color image pickup | ON | ON | ALWAYS ON | ON | OFF |
| | Time of black-and-white image pickup | OFF | OFF | | OFF | OFF |
| Second embodiment | Time of image pickup covering visible light and near infrared light | OFF | OFF | | OFF | ON |

| | | |
|---|---|---|
| S1 | ON | Transmission state of transmitting only green light within visible light |
| | OFF | Transmission state of transmitting light ranging from visible light to near infrared light |
| S2 | ON | Semitransparent mirror state |
| | OFF | Totally reflective state |
| C1 | ALWAYS ON | — |
| C2 | ON | Image pickup state |
| | OFF | Image pickup suspended state |
| M | ON | Near infrared cut filter is retracted toward outside of optical path |
| | OFF | Near infrared cut filter is placed within optical path |

The image pickup apparatus according to this embodiment switches between the operation conducted as the color camera and the operation conducted as the black-and-white camera as described above. Even when the operation is conducted as the color camera, one image pickup element is assigned to a green signal, which greatly contributes to a luminance signal, and hence the resolving power of the image pickup element can be maximally extracted. Further, when the operation is conducted as the black-and-white camera, the red light and the blue light used at the time of the color image pickup in order to extract the color signals can also be used effectively by switching to the mirror state of the light control mirror element 3 and the non-color emission state of the EC element 4. Therefore, not only the resolving power of the image pickup element can be maximally extracted, but also the operation can be conducted as the black-and-white camera with a high sensitivity.

As described above, according to this embodiment, the image pickup apparatus configured to easily switch between the color image pickup and the black-and-white image pickup, which is capable of picking up the color image while preventing degradation in the resolution at the time of the color image pickup and capable of preventing noise from occurring even under a low illuminance, can be obtained.

Second Embodiment

Figure 5:
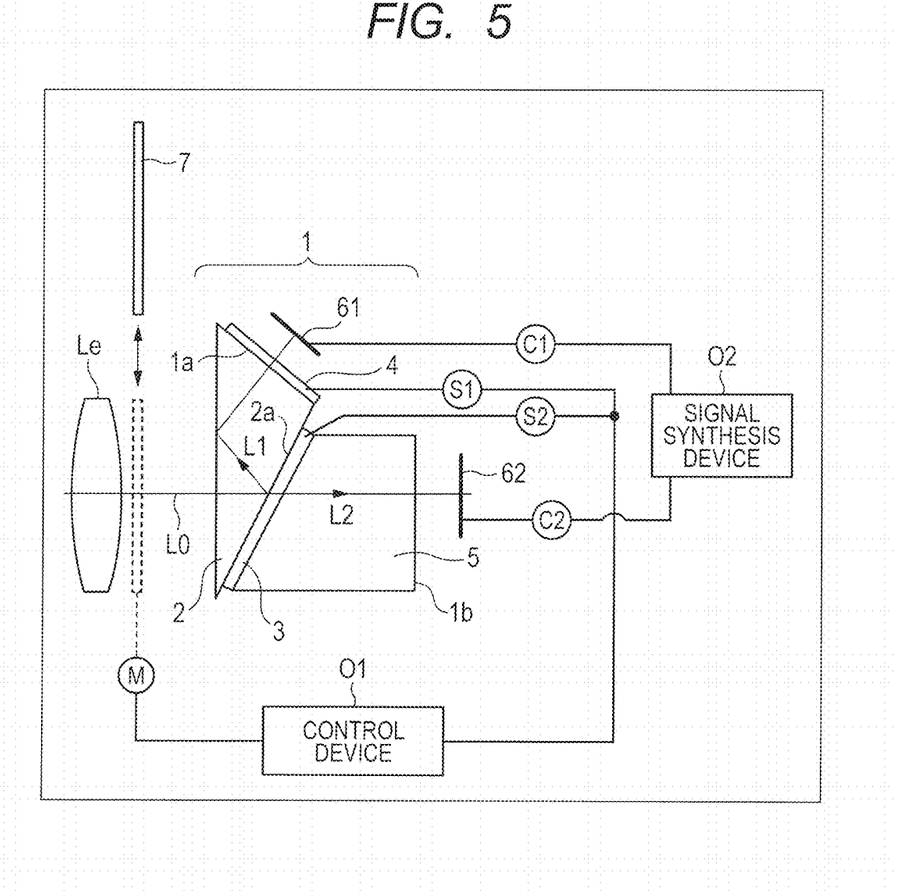
FIG. 5 is a schematic diagram of a main part of an image pickup apparatus according to a second embodiment of the present invention.

FIG. 5 is a schematic diagram of a main part of an image pickup apparatus according to a second embodiment of the present invention. In FIG. 5, the IRCut F. 7 is provided removably from an imaging optical path on a light incident side of the light flux splitting unit 1. The second embodiment is different from the first embodiment in that the near infrared cut filter 7 (IRCut F.) can be inserted into the optical path or removed from within the optical path at the time of the black-and-white image pickup (second mode). At the time of the color image pickup, the IRCut F. 7 is placed within the imaging optical path. The IRCut F. 7 is inserted into the optical path or removed from within the optical path by the drive unit M based on the signal from the control device O1.

Figure 6:
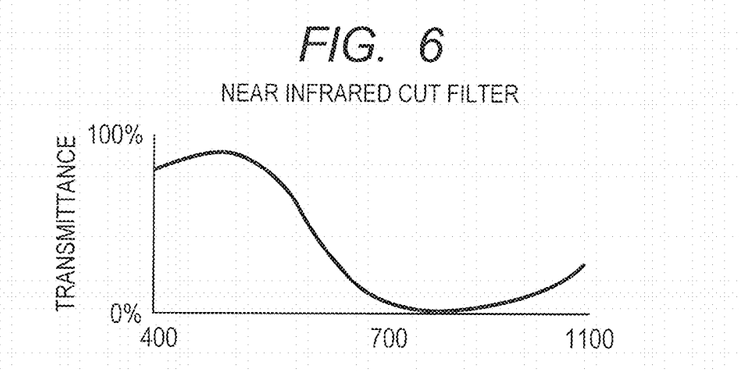
FIG. 6 is an explanatory graph of spectral characteristics of a near infrared cut filter of FIG. 5.

This embodiment is different from the first embodiment in that a light flux having a wide wavelength range (second wavelength range) is used by using not only the visible light but also the near infrared light (from wavelength of 700 nm to wavelength of 1,200 nm) when the black-and-white image is obtained. In FIG. 6, spectral characteristics of the near infrared cut filter 7 used in the second embodiment are shown. In FIG. 5, the members having the same functions as those of the first embodiment illustrated in FIG. 1 are denoted by the same reference symbols.

Next, an operation of this embodiment is described. The ON state and the OFF state of the respective members and optical actions of the respective members are shown in Table 1 as "Second embodiment". When the color image is obtained, the drive unit M is turned OFF, and the IRCut F. 7 is removably placed within the optical path. At this time, the image pickup state (first mode) for the color image is the same as in the first embodiment.

At the time of the black-and-white image pickup (second mode), the drive unit M is turned ON to retract the near infrared cut filter 7 from the imaging optical path of the image pickup optical system Le. The control unit S1 is turned OFF to bring the EC element 4 to a transmission state of transmitting the light ranging from the visible light to the near infrared light. The control unit S2 is turned OFF to bring the light control mirror element 3 to the totally reflective state.

Figure 7:
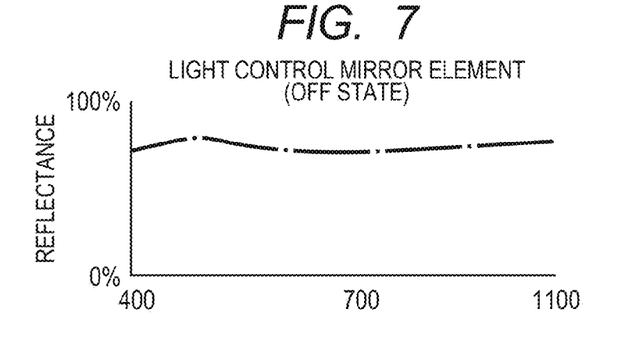
FIG. 7 is an explanatory graph of spectral characteristics of a light control mirror element of FIG. 5 in the mirror state.
Figure 8:
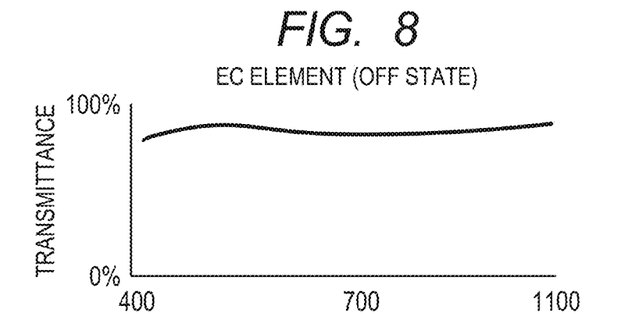
FIG. 8 is an explanatory graph of spectral characteristics of an electrochromic element of FIG. 5.

Reflectance characteristics of the light control mirror element 3 in the mirror state from a wavelength of 400 nm to a wavelength of 1,100 nm are shown in FIG. 7, and spectral characteristics of the non-color emission state of the EC element 4 are shown in FIG. 8. The imaging light flux L0 that has passed through the image pickup optical system Le moves toward the light flux splitting unit 1 without being inhibited by the near infrared cut filter 7, and enters the first prism 2. The first reflection surface 2a of the light control mirror element 3 provided on the surface of the first prism 2 reflects the imaging light flux L0 without inhibiting light energy thereof within a near infrared region.

The reflected light flux L1 is guided to an emitting surface of the first prism 2 to reach the first image pickup element 61 without having the light energy within a near infrared region inhibited by the EC element 4 in the non-color emission state, and is converted into a black-and-white electric signal by the first image pickup element 61. This provides a function of the single-plate image pickup apparatus (black-and-white camera) configured to effectively take in the light energy within the near infrared range.

In addition to the effects described in the first embodiment, the image pickup apparatus according to this embodiment effectively uses the light energy within the near infrared region as well. Further, this embodiment can be used for a near infrared camera by projecting the near infrared light having such a range that cannot be sensed by human eyes.

In the respective embodiments of the present invention, two signals among the color signals are obtained by the image pickup element provided with one prism and the mosaic filter for red and blue, but the present invention is not limited thereto. Further, the near infrared cut filter 7 is configured to be removable, but may be configured to produce the effects based on, for example, a characteristic change through use of the principle of electrochromism instead of a mechanical movement.

According to the present invention, there may be provided an image pickup apparatus capable of selectively picking up a color image and a black-and-white image while satisfactorily maintaining a resolving power.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-012914, filed Jan. 27, 2015, which is hereby incorporated by reference herein in its entirety.

What is claimed is:

1. An image pickup apparatus, comprising:
    a light control mirror element having a function of splitting an incident light flux into a first light flux derived from reflection and a second light flux derived from transmission and a function of switching between a semi-transmissive/semi-reflective state and a totally reflective state;
    a light flux splitting unit configured to cause the first light flux to be emitted from a first exit surface, and cause the second light flux to be emitted from a second exit surface;
    an electrochromic element configured to switch between a state of transmitting light having a first wavelength range out of the first light flux and a state of transmitting light having a second wavelength range out of the first light flux;
    a first image pickup element configured to pick up an image of the first light flux emitted from the first exit surface;

a second image pickup element configured to pick up an image of the second light flux emitted from the second exit surface; and a control device configured to conduct switching control between a first mode in which the light control mirror element is in the semi-transmissive/semi-reflective state and the electrochromic element is in the state of transmitting the light having the first wavelength range and a second mode in which the light control mirror element is in the totally reflective state and the electrochromic element is in the state of transmitting the light having the second wavelength range.

2. An image pickup apparatus according to claim 1, further comprising a near infrared cut filter removably provided on a light incident side of the light flux splitting unit, wherein:

the near infrared cut filter is placed within an optical path; and the control device is further configured to conduct switching control between the first mode in which the light control mirror element is in the semi-transmissive/semi-reflective state and the electrochromic element is in the state of transmitting the light having the first wavelength range and a second mode in which: the near infrared cut filter is retracted from within the optical path; the light control mirror element is in the totally reflective state; and the electrochromic element is in the state of transmitting the light having the second wavelength range.

3. An image pickup apparatus according to claim 1, wherein:

the first wavelength range comprises a wavelength range of green light; and the second wavelength range comprises a visible wavelength range.

4. An image pickup apparatus according to claim 2, wherein:

the first wavelength range comprises a wavelength range of green light; and the second wavelength range comprises a visible wavelength range and a near infrared wavelength range.

5. An image pickup apparatus according to claim 1, further comprising a signal synthesis device configured to:

form a color image in the first mode by using an image pickup signal obtained from the first image pickup element and an image pickup signal obtained from the second image pickup element; and form a monochrome image in the second mode by using the image pickup signal obtained from the first image pickup element.

6. An image pickup apparatus according to claim 1, wherein the second image pickup element comprises a mosaic filter in which a red filter that transmits red and a blue filter that transmits blue are two-dimensionally arranged, and is further configured to obtain a red image pickup signal and a blue image pickup signal.

7. An image pickup apparatus according to claim 1, wherein the light control mirror element is joined between two prism members.

* * * * *